US007762590B2

(12) United States Patent
Staub et al.

(10) Patent No.: US 7,762,590 B2
(45) Date of Patent: Jul. 27, 2010

(54) INDIVIDUALIZED SECURITY DOCUMENT

(75) Inventors: Réne Staub, Hagendorn (CH); Thomas Herbert Griebel, Hünenberg (CH); Olaf Krolzig, Beinwill am See (CH); Josef Bucher, Baar (CH)

(73) Assignee: OVD Kinegram AG, Zug (CH)

( * ) Notice: Subject to any disclaimer, the term of this patent is extended or adjusted under 35 U.S.C. 154(b) by 1221 days.

(21) Appl. No.: 10/521,192

(22) PCT Filed: Jul. 22, 2003

(86) PCT No.: PCT/EP03/07984

§ 371 (c)(1),
(2), (4) Date: Jan. 13, 2005

(87) PCT Pub. No.: WO2004/011272

PCT Pub. Date: Feb. 5, 2004

(65) Prior Publication Data

US 2005/0248147 A1 Nov. 10, 2005

(30) Foreign Application Priority Data

Jul. 24, 2002 (DE) ................................ 102 33 452

(51) Int. Cl.
*B42D 15/10* (2006.01)
*B32B 3/00* (2006.01)

(52) U.S. Cl. ............................ 283/72; 283/81; 283/94; 283/105; 428/43; 428/42.3

(58) Field of Classification Search ............. 283/74–75, 283/77–78, 94, 98, 100–101, 103–105, 107–110, 283/81; 428/40.1, 43, 42.1, 42.3, 202, 203
See application file for complete search history.

(56) References Cited

U.S. PATENT DOCUMENTS

| | | | | |
|---|---|---|---|---|
| 3,664,910 | A | 5/1972 | Hollie | |
| 4,533,160 | A * | 8/1985 | Malone | 462/54 |
| 4,667,983 | A * | 5/1987 | Spolander | 281/15.1 |
| 4,968,063 | A * | 11/1990 | McConville et al. | 283/72 |

(Continued)

FOREIGN PATENT DOCUMENTS

DE 197 32 712 A1 2/1998

(Continued)

OTHER PUBLICATIONS

Reisepass EG, http://www.bundesdruckerei.de/.

*Primary Examiner*—Dana Ross
*Assistant Examiner*—Pradeep C Battula
(74) *Attorney, Agent, or Firm*—Hoffman & Baron, LLP

(57) ABSTRACT

The present invention relates to an individualized security document such as a passport, savings book or bankbook or the like which has a number of pages which are joined together by means of a fixing or adhesive. Incorporated into the security document by means of the fixing or adhesive is a transfer film which is provided with security elements and which has a base film and a decorative layer arrangement having the security elements. The decorative layer arrangement can be transferred onto the associated page of the security document. At the same time the base film is detached from the decorative layer arrangement and can be cut out of the security document.

22 Claims, 2 Drawing Sheets

U.S. PATENT DOCUMENTS

| | | | | |
|---|---|---|---|---|
| 5,037,139 | A | 8/1991 | Schoenleber et al. | |
| 5,103,583 | A * | 4/1992 | VanErmen | 40/638 |
| 5,211,424 | A * | 5/1993 | Bliss | 281/15.1 |
| 5,387,013 | A * | 2/1995 | Yamauchi et al. | 283/86 |
| 5,874,145 | A * | 2/1999 | Waller | 428/42.1 |
| 5,897,144 | A | 4/1999 | Uno | |
| 6,135,503 | A | 10/2000 | Lob et al. | |
| 6,213,702 | B1 * | 4/2001 | Wesselink | 412/1 |
| 6,808,792 | B1 * | 10/2004 | Weber | 428/202 |

FOREIGN PATENT DOCUMENTS

| | | | |
|---|---|---|---|
| DE | 198 14 420 | A1 | 5/1999 |
| DE | 199 40 790 | A1 | 3/2001 |
| DE | 100 13 410 | A1 | 9/2001 |
| DE | 101 29 701 | A1 | 1/2003 |
| EP | 0 364 730 | A2 | 4/1990 |
| GB | 2326375 | A * | 12/1998 |
| JP | 02111590 | A | 4/1990 |
| JP | 02111591 | A | 4/1990 |
| JP | 10153944 | | 6/1998 |
| JP | 11227344 | | 8/1999 |
| JP | 2000043458 | | 2/2000 |
| JP | 2001270275 | | 10/2001 |
| WO | WO93/12940 | * | 7/1993 |

* cited by examiner

INDIVIDUALIZED SECURITY DOCUMENT

CROSS-REFERENCE TO RELATED APPLICATIONS

This application is a National Phase application of International Application No. PCT/EP03/07984 filed Jul. 22, 2003, which claims priority based on German Patent Application No. 10233452.8, filed Jul. 24, 2002, which are incorporated herein by reference.

BACKGROUND OF THE INVENTION

The invention concerns an individualized security document such as a passport, a driver's license, a notarial certificate, an authenticity, license guarantee certificate, a savings book or bankbook or the like which has a number of pages which are joined together by means of stitching, folding or adhesive.

Such security documents involve use of transfer films as are described in DE 199 40 790 A1. That known transfer film does not require a relatively high level of machine complication and expenditure for processing thereof but can be reliably and properly processed using relatively simple apparatuses because the transfer film, by virtue of its base film which is stable in respect of shape, enjoys the stability required for simple processing. In that known transfer film, the base film with a carrier film and with a decorative layer arrangement can be subdivided into a plurality of label-like individual elements, in which case the individual elements can be arranged on a carrier film web in such a way that they can be pulled off the web.

The management and handling of such individual elements or transfer films provided with security elements, and the associated individualized security documents such as passports, savings books or bankbooks or the like involves a degree of complication and expenditure which cannot be disregarded. The above-mentioned handling operation and the management procedure also involve possible sources of error.

SUMMARY OF THE INVENTION

Therefore the object of the present invention is to provide an individualized security document of the kind set forth in the opening part of this specification, wherein handling and management of the security documents and the transfer film which is provided with security elements is substantially simplified.

According to the invention that object is attained by the features of claim 1. Preferred developments and embodiments of the security document according to the invention are characterized in the appendant claims.

In accordance with the invention incorporated into the individualized security document is a transfer film which is provided with at least one security element and which has a base film and a decorative layer arrangement having the security elements. The transfer film provided with security elements is incorporated into the security document by adhesive or stitching or tacking of the security document. That advantageously provides for accurate positioning of the transfer film or the security elements of the transfer film in relation to the respective security document. It would also be possible for the security element to be glued into the security document by means of an adhesive or an adhesive strip. That can involve a temporary adhesive or a permanent adhesive. It is particularly advantageous that handling of the security documents and the transfer films provided with the security elements is substantially simplified and special management thereof is virtually eliminated. In a further advantageous manner that provides that possible sources of error in regard to associating security documents and associated transfer films provided with security elements are substantially reduced.

In accordance with the invention the base film of the transfer film which is provided with security elements can comprise a plastic material. The plastic material may be a non-transparent or a transparent plastic material. Such a configuration of the last-mentioned kind, with a base film comprising a transparent plastic material, has the advantage that positioning of the transfer film is easily possible and that checking and comparison for example of data and pass numbers and so forth are easily possible.

In accordance with the invention it is also possible for the base film of the transfer film which is provided with security elements to comprise paper or a paper-like substrate. In such an embodiment the base film can have at least one window opening. It is for example possible for the pass number for example of the security document to be made visible during the personalization procedure through the window opening.

Irrespective of whether the base film comprises paper or transparent plastic material, the decorative layer arrangement having security elements can be temporarily connected by means of a release layer to a carrier film which is permanently joined to the base film by means of a permanent adhesive. If the base film comprises a transparent plastic material, it is optionally also possible to forego the carrier film.

In accordance with the invention the decorative layer arrangement having security elements can be dispensed as a label onto the base film or to the carrier film permanently connected to the base film. Another possible option provides that the decorative layer arrangement is laminated onto the base film or onto the carrier film permanently connected to the base film.

The security element can completely or only partially cover one page of the security document. It is possible to provide holes or openings in order for example to leave free a signature area or space for an integrated chip.

The security elements of the decorative layer arrangement may involve structures which have a holographic action or which have an optical-diffraction effect.

In the individualized security document of the invention the base film and/or the carrier film can be provided with position markings for accurate positioning of the decorative layer arrangement. It is likewise possible for the base film and/or the carrier film to be provided with numberings, barcodes or universal product codes or the like.

For easily performing the operation, in a labor-saving and time-saving manner, of cutting out the base film or the base film with the carrier film permanently connected thereto, after transfer of the decorative layer arrangement onto the associated page of the security document, it has proven to be advantageous if the base film is provided with a perforation. Independent patent protection is requested in this respect. In this connection, it is possible that the perforation is provided only in the base film and the decorative layer arrangement is laterally spaced from the perforation, or that the perforation extends through the base film and through the decorative layer arrangement.

By folding configurations, stampings, projecting "corners" and the like, the composite structure consisting of the decorative layer and the transfer film can be modified in such a way that a cutting-out operation can be effected more easily, after the lamination step.

In accordance with the invention the perforation of the transfer film having security elements can be provided in alignment with the tacking or stitching fixing or adhesive of the security document and the transfer film provided with the security elements can be fixed by means of the tacking or stitching or adhesive in the security document. Another possibility provides that the perforation of the transfer film having security elements is disposed laterally displaced with respect to the tacking or stitching or adhesive of the security document and the edge region of the transfer film, which is defined by the perforation, is fixed by means of the tacking or stitching or adhesive in the security document, in such a way that a base film strip remains on both sides of the tacking or stitching or adhesive when the base film, after transfer of the transfer film onto the corresponding page of the security document, is separated out of the security document along the perforation.

In such a configuration of the last-mentioned kind, the base film can comprise a security paper having security features, optionally with printing thereon, so that this provides a base film strip with corresponding security features, the base film strip remaining in the security document.

Optionally it is also possible for the transfer film to be printed upon in the individualization or personalization procedure.

In accordance with the invention the transfer film provided with security elements can involve surface dimensions adapted to a page of the security document. It is however also possible for the transfer film provided with security elements to be of surface dimensions adapted to a double page of the security document.

BRIEF DESCRIPTION OF THE DRAWINGS

Further details, features and advantages will be apparent from the description hereinafter of the embodiment, diagrammatically illustrated in the drawing, of the individualized security document according to the invention such as a passport, a savings book or bankbook or the like. In the drawing.

DETAILED DESCRIPTION OF THE INVENTION

Figure 1:
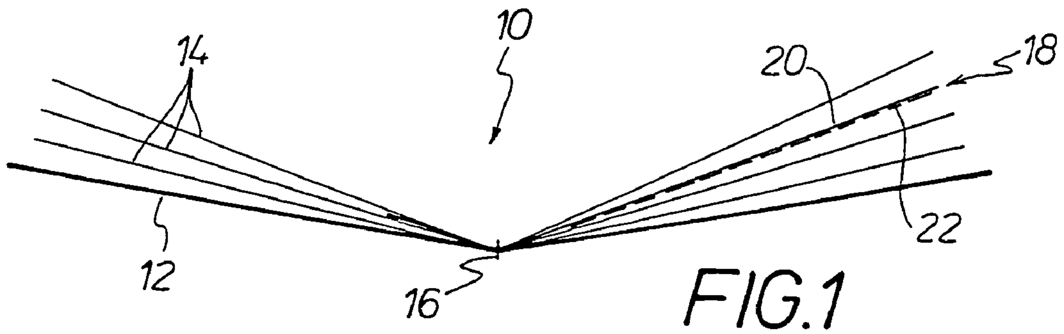
FIG. 1 diagrammatically shows a front view of a first embodiment of the security document.

FIG. 1 diagrammatically shows an opened individualized security document 10 which for example is a passport. The security document 10 has a cover 12 and a number of pages 14 which are joined together and to the cover 12 by means of a fixing or tacking 16. The tacking 16 can be a stitched seam or a staple arrangement. The pages 14 and the cover 12 can also be joined together in per se known manner by means of adhesive.

A transfer film 18 provided with security elements is incorporated into the security document 10 by means of the tacking or stitching 16. The transfer film 18 has a base film 20 and a decorative layer arrangement 22 having the security elements, as will be described in detail hereinafter with reference to FIG. 7. Such a transfer film is also disclosed in above-mentioned DE 199 40 790 A1.

After the transfer of the decorative layer 22 indicated in FIG. 1 by a broken line, this operation being effected by the suitable action of heat, in which case the base film 20 is detached from the decorative layer arrangement 22, the base film 20 is cut out of the security document 10. The decorative layer arrangement 22 remains adhering firmly over a large area to the corresponding page 14 of the security document 10. The decorative layer arrangement 22 can also be provided on the cover 12 and can cover it extensively or partially.

Figure 2:
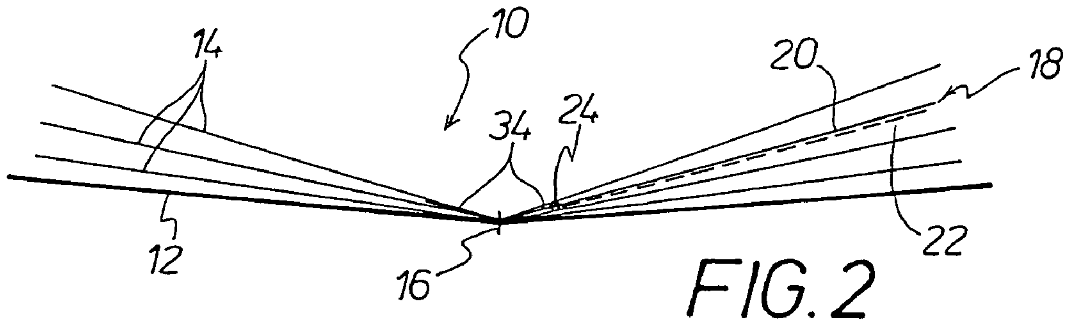
FIG. 2 shows a front view similar to FIG. 1 of a second embodiment of the security document.

FIG. 2 is a diagrammatic view similar to FIG. 1 showing a security document 10 with a cover 12 and pages 14 which are joined together and to the cover 12 by means of a fixing 16 to form the security document 10. Incorporated into the security document 10 is a transfer film 18 having a base film 20 and a decorative layer arrangement 22.

The transfer film 18 is provided with a perforation 24. As FIG. 5 also clearly shows, the perforation 24 is provided in the base film 20 and is laterally spaced from the decorative layer arrangement 22. That lateral spacing is identified by reference 26 in FIG. 5. The perforation 24 is definedly spaced from the one edge 28 of the base film 20 and extends parallel to the edge 28. That spacing is identified by reference 30 in FIG. 5. The transfer film 18 is incorporated into the security document 10 in such a way that the stitching or fixing 16 extends in a central region of the edge portion 32 of the base film 20, which is delimited by the side edge 28 of the base film 20 and the perforation 24 in the base film 20 (see FIG. 5).

After transfer of the decorative layer arrangement 22 onto the associated page 14 of the security document 10, the base film 20 which is released from the decorative layer arrangement 22 during the transfer operation is cut out of the security document 10 along the perforation 24 so that a respective base film strip 34 remains on each of the two sides of the fixing 16 (see FIG. 2). That base film strip 34 can have security features. In such a design configuration, the base film 20 of the transfer film 18 which is incorporated into the security document 10 desirably comprises a security paper.

Figure 3:
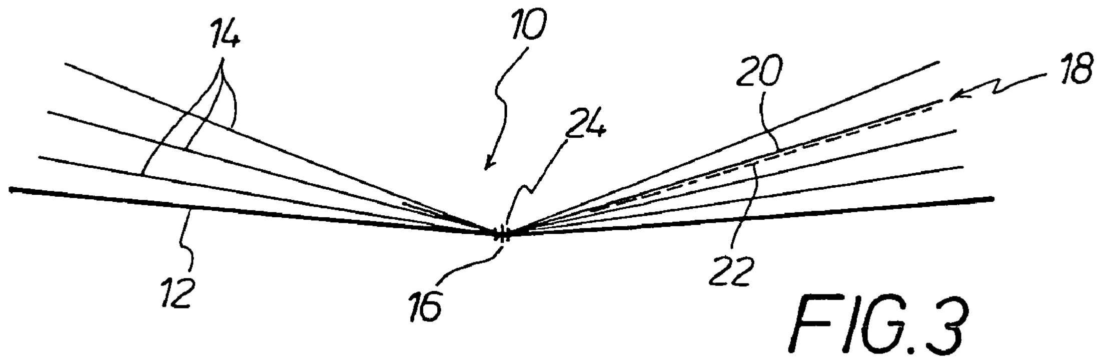
FIG. 3 shows a front view similar to FIGS. 1 and 2 of a third embodiment of the security document.

FIG. 2 diagrammatically illustrates a design configuration in which the perforation 24 of the transfer film 18 and the stitching fixing 16 of the security document 10 are laterally spaced from each other. In comparison FIG. 3 diagrammatically shows an embodiment in which the stitching 16 of the security document 10 and the perforation 24 of the transfer film 18 which is bound into the security document 10 are provided in coincident relationship. After transfer of the decorative layer arrangement 22 onto the associated page 14 of the security document 10 the base film 20 is cut out of the security document 10 along the perforation 24 entirely, that is to say without any residue, on both sides of the fixing 16.

Figure 4:
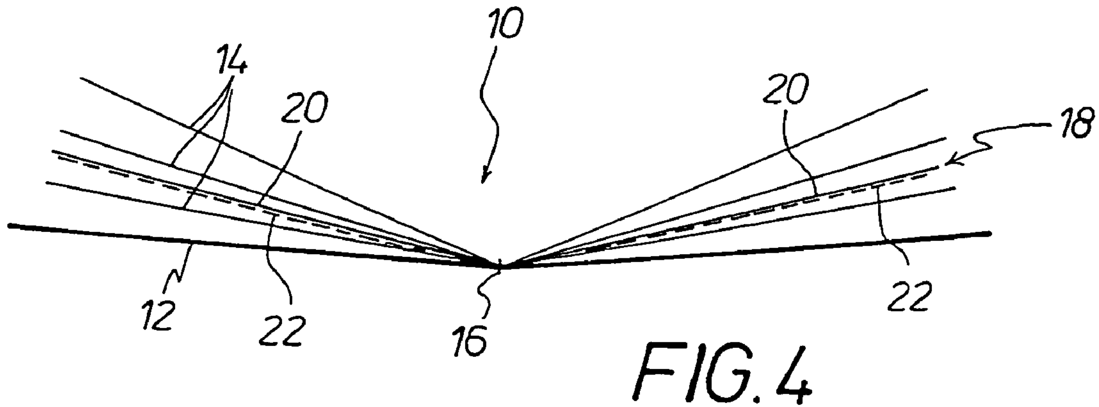
FIG. 4 shows a front view similar to FIGS. 1 through 3 of a fourth embodiment of the security document.

FIGS. 1 through 3 show embodiments of the individualized security document 10 in which the transfer film 18 provided with security elements is of surface dimensions adapted to one page of the security document 10. In comparison FIG. 4 diagrammatically shows an embodiment in which the transfer film 18 provided with security elements is of surface dimensions which are adapted to a double page of the individualized security document 10.

The same features are each identified in FIGS. 1 through 4 by the same references so that there is no need all features to be respectively described in detail again in relation to all those Figures.

Figure 5:
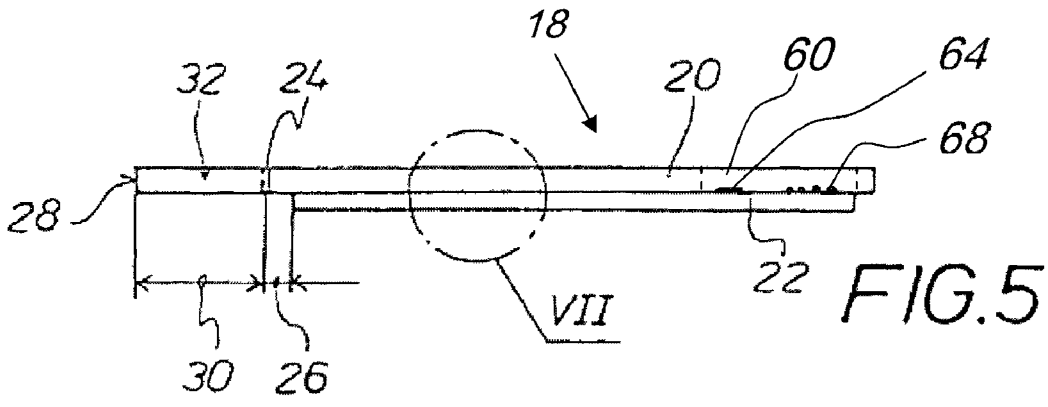
FIG. 5 is a diagrammatic view, which is not true to scale, of an embodiment of the transfer film of the security document shown in FIG. 2.
Figure 6:
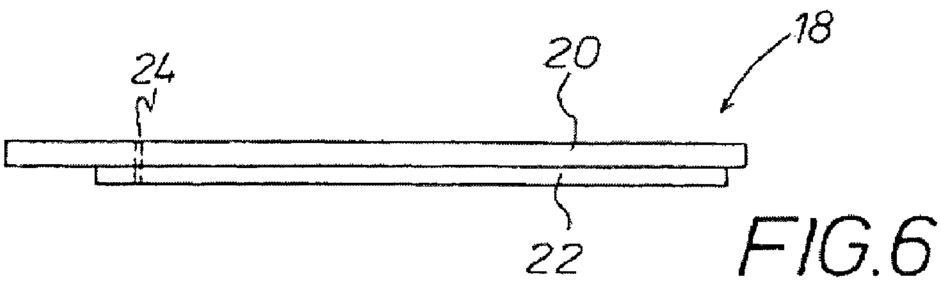
FIG. 6 is a diagrammatic view similar to FIG. 5 of another embodiment of the transfer film for the security document as shown in FIGS. 1, 2 or 3.

FIG. 6 diagrammatically shows an end view similar to FIG. 5 of an embodiment of the transfer film 18 with a perforation 24 which extends through the base film 20 and through the decorative layer arrangement 22 of the transfer film 18.

Figure 7:
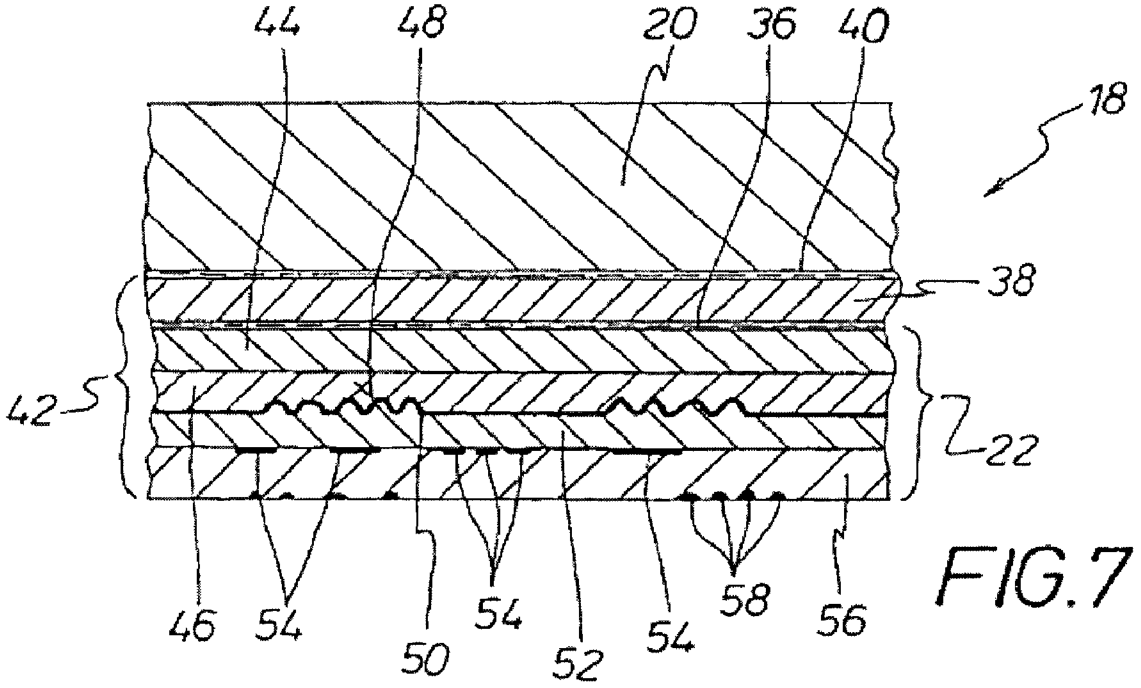
FIG. 7 is a greatly enlarged sectional view, which is not true to scale of the transfer film as indicated at the detail VII in FIG. 5.

FIG. 7 is a greatly enlarged sectional view which is not true to scale of an embodiment of the transfer film 18 with the base film 20 of paper or transparent plastic material and with the decorative layer arrangement 22 which is detachably connected to a carrier film 38 by means of a release layer 36. The carrier film 38 is permanently connected to the base film 20 by means of a permanent adhesive 40. The carrier film 38 and the decorative layer arrangement 22, with the release layer 36 provided between them, form a per se known hot stamping film 42.

If the base film 20 comprises a transparent plastic material, it is optionally also possible to eliminate the carrier film 38. The base film 20 and/or the carrier film 38 can be provided with markings 64 and/or printing 68 (see FIG. 5).

The decorative layer arrangement 22 has a protective lacquer layer 44 and a replication lacquer layer 46. That replication lacquer layer 46 has a structure 48 which has a holographic action or which has an optical-diffraction effect. The structure 48 is provided with a highly reflective layer 50, thereby providing a security element. The decorative layer arrangement 22 also has a bonding agent or first adhesive layer 52. The bonding agent or first adhesive layer 52 is provided with markings 54. The bonding agent or first adhesive layer 52 with the markings 54 is covered by a second adhesive layer 56. The second adhesive layer 56 is partially provided with printing 58 thereon.

In regard to further details such as the composition, the layer thicknesses and so forth of the individual layers of the transfer film 18, reference is directed to above-mentioned DE 199 40 790 A1 which in that respect constitutes part of the disclosure of the present invention.

Thus for example the transfer film 18 is of the following detailed composition:

Base Film 20

The base film 20 is a reinforcing layer which is known per se from labels. It is possible to use for example a plastic film. Preferably however a silicone paper is used as the base film. Also, the base film 20 can be provided with at least one window opening 60.

Permanent Adhesive 40

The permanent adhesive 40 has to reliably perform the function of ensuring that the base film 20 and the carrier film 38 remain firmly joined together even when heat is used for transferring the transfer film onto the substrate. That condition is met by generally familiar, permanently adhering acrylate dispersion adhesives.

Carrier Film 38

Here the carrier films which are usual in relation to hot stamping films are used, in which respect plastic films which have a very smooth surface in order not to adversely affect the transparency of the decorative layer arrangement due to surface irregularities are appropriately used. In a large number of cases the carrier film used is polyester films of a thickness of 20 μm, in which respect, in the present case, it is also possible to use thinner carrier films as in fact the carrier film is reinforced by the base film during the handling procedure.

The release layer is generally applied over the full surface area involved, in a layer thickness of between about 0.01 and 0.2 μm.

Protective Lacquer Layer 44

The protective lacquer layer 44 is also generally applied over the full surface area, more specifically in a layer thickness of between 0.5 and 5.0 μm, preferably between 1 and 2 μm.

Replication Lacquer Layer 46

The replication lacquer layer 46 can be applied over the full surface area involved, but also only in a region-wise manner, more specifically when for example the aim is to provide that the structure 48 which has a holographic action or which has an optical-diffraction effect is provided only in a region-wise manner. The layer thickness of the replication lacquer layer is between 0.05 and 1.5 μm.

Structure 48

The structure 48 can be a generally known structure which is conventional for so-called OVDs and which has an optical-diffraction effect or a holographic action, for example a grating structure, the optical properties of the structure being determined by the corresponding structural parameters, for example grating frequency, grating depth, grating inclination and so forth. The structure is generally introduced into the replication lacquer layer 46 in a replication procedure during production of the hot stamping film 42.

Highly Reflective Layer 50

The function of the highly reflective layer 50 is to improve the visibility of the structure 48 which has a holographic action or an optical-diffraction effect, in which respect, as consideration of FIG. 7 shows, it is at the same time necessary to ensure that the viewer can see through the layer 50 in order to recognize the markings 54 and the printing 58.

That function can be fulfilled for example by a vapor-deposited, highly refractive layer of a thickness of between 10 and 500 nm, in which respect for example metal oxides, metal sulfides, titanium dioxide and so forth can perform that function.

Adhesive Layers 52 and 56

As already mentioned, it is possible for the two layers 52 and 56 to be produced from the same transparent material. It would however also be conceivable for the layer 52 to be provided only as a bonding agent layer between the adhesive layer 46 and the coating 50 of the structure 48.

In the illustrated embodiment it is assumed that two identical adhesive layers are used, which are provided over the full surface area and which involve a layer thickness of between 2 and 10 μm, preferably between 3 and 6 μm.

Markings 54, 64

The markings preferably involve elements which are applied in a printing operation after application of the first adhesive layer, for example special graphic elements, a text—visible only under given viewing conditions—, and so forth. In the illustrated embodiment it is assumed that the markings are formed by a decorative lacquer which is responsive to UV light.

Printing 58, 68

As already mentioned, the printing 58 applied to the free surface of the adhesive layer 56 is produced by means of familiar printing processes, for example by means of laser printing, thermotransfer printing, and so forth. It would theoretically even be possible to apply further markings by hand, instead of a printing 58. Laser printing or thermotransfer printing however are to be preferred because in that case, by virtue of the transfer film being fixed on the substrate and the effect of heat, it is to be assumed that the particles producing the printing at least partially also directly adhere to the substrate. If then in such a situation an attempt is made to detach the decorative layer arrangement from the substrate, it must be reckoned that at least residues of the printing serving for identification purposes adhere directly to the substrate, so that it is not possible to detach the decorative layer arrangement without leaving traces.

A particularly advantageous embodiment of the transfer film is such that the decorative layer arrangement is transparent and the adhesive layer serving for fixing the decorative layer arrangement to the substrate is printed by means of a printer, for example a laser printer or a thermotransfer printer. When using a transfer film of that kind for example suitable individualization can be effected by printing on the adhesive layer. It is for example conceivable for the page of a passport, which contains the personal data, to be safeguarded using the transfer film, in which case the basic information can be applied in production in the factory of the transfer film using a suitable printing process, for example between individual layers of the decorative layer arrangement, which are provided over the entire surface area, while the person-related data, for example name, forename, address, date of birth and picture of the passport holder, are then applied by printing by means of a suitable printer prior to use of the transfer film, on the adhesive layer thereof. After the individualizing printing operation the transfer film is then laid with the printed adhesive layer onto the adjacent page of the security document and then fixed to that page by heat or possibly the effect of pressure. This embodiment has the advantage that the items of individualizing information are covered over by the decorative layer arrangement of the transfer film, in other words, it is not possible to make a change without at the same time damaging the decorative layer arrangement. If an attempt is made to pull the decorative layer arrangement off the page in order to alter the individualizing data, it is necessary to reckon on the decorative layer arrangement being destroyed. In addition, in the normal situation, it is to be assumed that the individualizing data are also to be found on the page again, because, with the usual process conditions, on the transfer film, at least a certain proportion of the printing ink present on the adhesive layer is also connected directly to the substrate.

The decorative layer arrangement can be colored or printed upon.

What is claimed is:

1. An individualized security document comprising:

a number of pages joined together by a means of fixing or adhesive, wherein incorporated into the security document by the means of fixing or adhesive is a transfer film which is provided with security elements and which has a base film and a decorative layer arrangement which is provided with the security elements, the base film being releasably secured to the decorative layer arrangement, the decorative layer arrangement having an adhesive layer on a side remote from the base film, wherein the decorative layer arrangement having security elements is temporarily connected by means of a release layer to a carrier film which is permanently connected to the base film by means of a permanent adhesive, and wherein at least the base film is provided with a perforation for cutting out the base film or the base film with the carrier film permanently connected thereto.

2. An individualized security document as set forth in claim 1, wherein the base film of the transfer film provided with security elements comprises a transparent or non-transparent plastic material.

3. An individualized security document as set forth in claim 1, wherein the base film of the transfer film which is provided with security elements comprises paper.

4. An individualized security document as set forth in claim 3, wherein the base film has at least one window opening.

5. An individualized security document as set forth in claim 1, wherein the decorative layer arrangement is applied in the form of a label to the base film or to the carrier film which is permanently connected to the base film.

6. An individualized security document as set forth in claim 1, wherein the decorative layer arrangement is laminated onto the base film or onto the carrier film which is permanently connected to the base film.

7. An individualized security document as set forth in claim 1, wherein the decorative layer arrangement is transparent or partially transparent.

8. An individualized security document as set forth in claim 1, wherein the base film and/or the carrier film is provided with markings and/or numberings.

9. An individualized security document as set forth in claim 1, wherein the perforation is provided only in the base film and the decorative layer arrangement is laterally spaced from the perforation.

10. An individualized security document as set forth in claim 1, wherein the perforation extends through the base film and through the decorative layer arrangement.

11. An individualized security document as set forth in claim 1, wherein the perforation of the transfer film having security elements is provided in coincident relationship with the fixing or adhesive of the security document and the transfer film provided with security elements is fixed by means of the fixing or adhesive in the security document.

12. An individualized security document as set forth in claim 1, wherein the perforation of the transfer film having security elements is disposed laterally displaced with respect to the fixing or adhesive of the security document and the edge region of the transfer film, which edge region is defined by the perforation, is fixed in the security document by means of the fixing or adhesive in such a way that a base film strip remains on both sides of the fixing.

13. An individualized security document as set forth in claim 12, wherein the base film comprises a security paper having security features.

14. An individualized security document as set forth in claim 1, wherein the transfer film provided with security elements is of surface dimensions adapted to a page of the security document.

15. An individualized security document as set forth in claim 1, wherein the transfer film provided with security elements is of surface dimensions adapted to a double page of the security document.

16. An individualized security document as set forth in claim 1, wherein the transfer film includes a means for separating a portion of the base film away from the security document, wherein at least another portion of the base film remains on the security document after the portion of the base film is separated away from the security document along the separation means.

17. An individualized security document as set forth in claim 16, wherein the means for separation includes at least one perforation through the transfer film.

18. An individualized security document as set forth in claim 16, wherein the separation means is included on at least one of the base film and the decorative layer arrangement.

19. A security document comprising:

a plurality of individual pages joined to form a book by a means of fixing, at least one transfer film joined to one of the pages by the fixing means, the transfer film including a base film and a decorative layer arrangement, the base film being releasably secured to the decorative layer arrangement, the decorative layer arrangement including at least one security element temporarily connected by means of a release layer to a carrier film which is permanently connected to the base film by means of a permanent adhesive, and further wherein on a side remote from the base film the decorative layer arrangement includes an adhesive layer, and wherein at least the base film is provided with a perforation for cutting out the base film or the base film with the carrier film permanently connected thereto.

20. A security document as set forth in claim 19, wherein the transfer film includes a means for separating a portion of the base film away from the security document along the separation means, such that upon separation of the portion of the base film from the security document, another portion of the base film remains fixed to the security document.

21. A security document as set forth in claim 20, wherein the separation means includes at least one perforation.

22. A security document as set forth in claim 19, wherein the separation means is included on at least one of the base film and the decorative layer arrangement.

* * * * *

UNITED STATES PATENT AND TRADEMARK OFFICE

CERTIFICATE OF CORRECTION

PATENT NO. : 7,762,590 B2
APPLICATION NO. : 10/521192
DATED : July 27, 2010
INVENTOR(S) : Staub et al.

It is certified that error appears in the above-identified patent and that said Letters Patent is hereby corrected as shown below:

Title Page, Item (74) Atty, Agent, or Firm:

Now reads: "(74) Attorney, Agent, or Firm-Hoffman & Baron, LLP"

Should read: -- (74) Attorney, Agent, or Firm-Hoffmann & Baron, LLP --

Signed and Sealed this
Twenty-second Day of February, 2011

David J. Kappos
*Director of the United States Patent and Trademark Office*